United States Patent
Suzuki et al.

(10) Patent No.: US 8,805,202 B2
(45) Date of Patent: Aug. 12, 2014

(54) SYSTEM FOR VISIBLE LIGHT COMMUNICATION USING SINGLE LIGHT SOURCE

(75) Inventors: Katsuyoshi Suzuki, Soka (JP); Shigehito Shimada, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 777 days.

(21) Appl. No.: 12/491,318

(22) Filed: Jun. 25, 2009

(65) Prior Publication Data

US 2010/0067916 A1 Mar. 18, 2010

(30) Foreign Application Priority Data

Sep. 12, 2008 (JP) ................................. 2008-235140

(51) Int. Cl.
*H04B 10/00* (2013.01)

(52) U.S. Cl.
USPC ........... 398/171; 398/168; 398/169; 398/170; 398/172

(58) Field of Classification Search
CPC ........ H04B 10/40; H04B 10/43; H04B 10/50; H04B 10/51; H04B 10/501; H04B 10/502; H04B 10/516; H04B 10/54; H04B 10/541; H04B 2001/38; H04B 2001/3827; H04B 2001/3833; H04B 2001/385; H04B 2001/3855; H04B 2001/3861; H04B 2001/3866; H04B 2001/3872; H04B 2001/48
See application file for complete search history.

(56) References Cited

U.S. PATENT DOCUMENTS

| | | | | |
|---|---|---|---|---|
| 5,221,983 | A * | 6/1993 | Wagner | 398/72 |
| 6,344,846 | B1 * | 2/2002 | Hines | 345/166 |
| 7,317,876 | B1 | 1/2008 | Elliott | |
| 2002/0060825 | A1 * | 5/2002 | Weigold et al. | 359/152 |
| 2002/0167701 | A1 | 11/2002 | Hirata | |
| 2006/0056855 | A1 * | 3/2006 | Nakagawa et al. | 398/183 |
| 2008/0107419 | A1 * | 5/2008 | Won | 398/130 |
| 2010/0028021 | A1 | 2/2010 | Shimada et al. | |

FOREIGN PATENT DOCUMENTS

| | | |
|---|---|---|
| GB | 2 186 457 | 8/1987 |
| JP | 01-122220 | 5/1989 |
| JP | 01-272237 | 10/1989 |
| JP | 06-112902 | 4/1994 |
| JP | 06-265835 | 9/1994 |
| JP | 06-289340 | 10/1994 |
| JP | 11-068129 | 3/1999 |
| JP | 11-088264 | 3/1999 |
| JP | 2000-022637 | 1/2000 |
| JP | 2002-190778 | 7/2002 |
| JP | 2002-290335 | 10/2002 |
| JP | 2004-221747 | 8/2004 |
| JP | 2007-274580 | 10/2007 |

* cited by examiner

OTHER PUBLICATIONS

European Search Report dated Nov. 13, 2009, for European Patent Application No. 09163464.2 (7 pages).
Notification of Reasons for Rejection mailed Jun. 22, 2010, from the Japanese Patent Office for Japanese Patent Application No. 2008-235140 (2 pages).
Notification of Reasons for Rejection mailed Jun. 22, 2010, from the Japanese Patent Office for Japanese Patent Application No. 2008-196165 (3 pages).
European Search Report dated Nov. 27, 2009, for European Patent Application No. 09162845.3 (8 pages).
J. Gao, "Optical Retroreflector-based Sensor Networks for In-Situ Science Applications," IEEE Aerospace Conference 2003, vol. 3, Mar. 8, 2003, pp. 3-1295 through 3-1302.

*Primary Examiner* — Darren E Wolf
(74) *Attorney, Agent, or Firm* — Finnegan, Henderson, Farabow, Garrett & Dunner, LLP

(57) ABSTRACT

According to one embodiment, there is provided a visible-light communications system in which bidirectional visible-light communication is performed between a visible-light communications device and a mobile terminal. The device has one light source. The mobile terminal has a retroflection unit. The mobile terminal further has first and second optical filters. The first optical filter extracts a visible light beam modulated with the data transmitted from the visible-light communications device. The second optical filter extracts a visible light beam that will be used as a retroflection light beam that is not modulated.

10 Claims, 3 Drawing Sheets

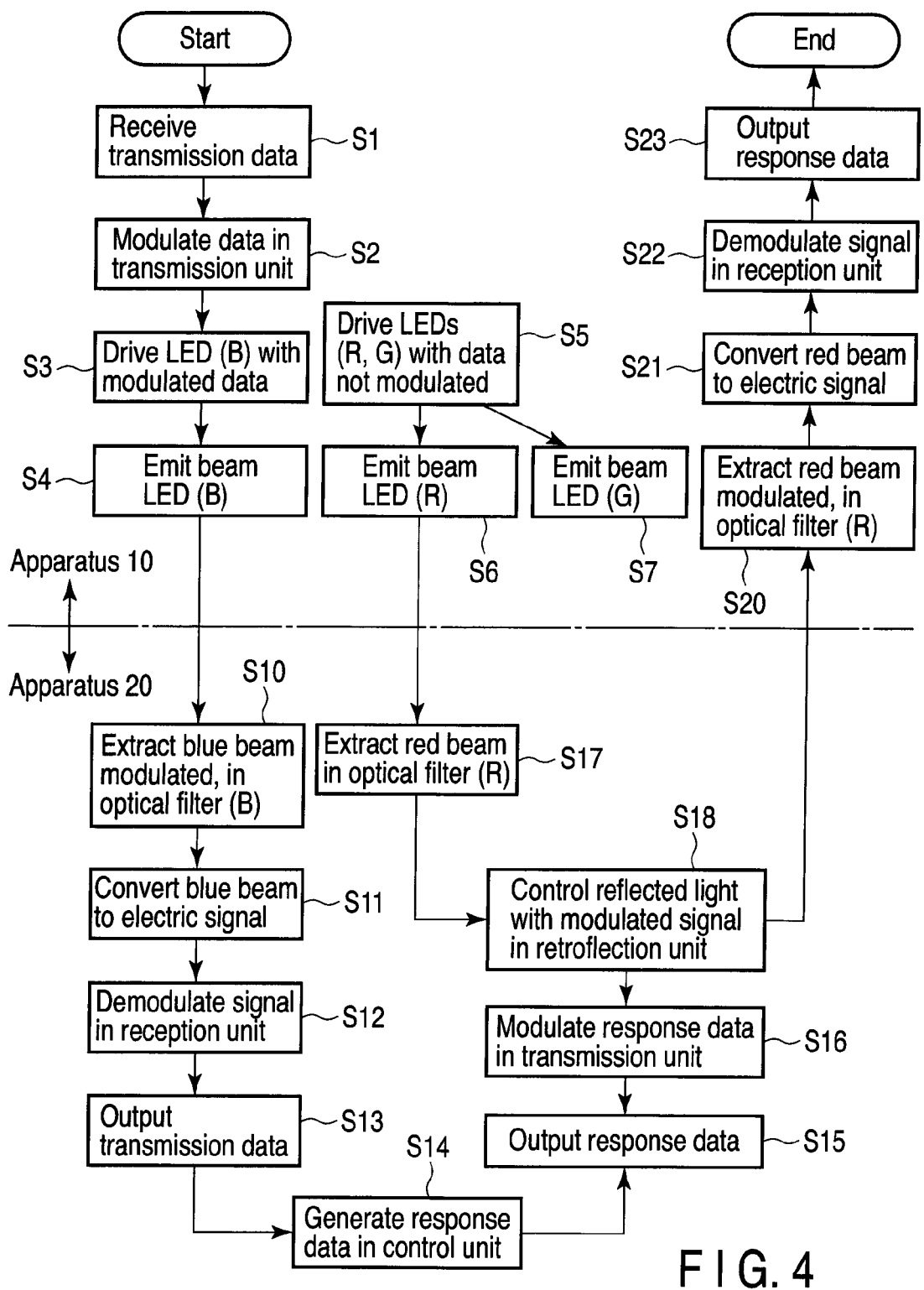
F I G. 4

SYSTEM FOR VISIBLE LIGHT COMMUNICATION USING SINGLE LIGHT SOURCE

CROSS-REFERENCE TO RELATED APPLICATIONS

This application is based upon and claims the benefit of priority from prior Japanese Patent Application No. 2008-235140, filed Sep. 12, 2008, the entire contents of which are incorporated herein by reference.

BACKGROUND OF THE INVENTION

1. Field of the Invention

The present invention relates to a visible-light communications technique that achieves bidirectional visible-light communication.

2. Description of the Related Art

In recent years, a visible-light communications technology has been developed which utilizes the visible light emitted from a light source such as a light emitting diode (hereinafter referred to as "LED," on some occasions). To accomplish bidirectional communication using visible light, it is proposed that a hybrid system should be utilized in place of a system wherein the transmitting side and the receiving side have a light source each. In the hybrid system, visible light communication is combined with infrared-ray communication or radio-wave communication.

However, such hybrid system may fail to achieve fully the advantage of visible light communication, i.e., that which takes place within the visible light spectrum. In such system, both the transmitting side and the receiving side have a light source each and therefore need a power supply each, for the light source. Inevitably, it is difficult to apply this system to communications apparatuses that have but a limited power supply, such as mobile terminals.

In view of this, a single-light-source system has been proposed, which has two communication apparatuses and in which one apparatus has a light source that emits visible light and the other apparatus reflects the visible light, thereby transmitting data to the first-mentioned apparatus. (See, for example, Jpn. Pat. Appln. KOKAI Publication No. 2004-221747.)

The single-light source system in which one of the apparatuses need not have a light-source power supply can accomplish bidirectional visible-light communication using mobile terminals that are designed to operate with low power consumption.

In the single-light-source system, wherein the visible light beam emitted from one communications apparatus is superimposed with transmission data, one of the communication apparatuses cannot transmit data merely by using a reflected light beam obtained from the visible light beam. This is because the visible light emitted from the transmitting side is superimposed with the transmission data. Hence, a visible-light communications system that uses a single light source must be subjected to some restrictions, such as the use of a light beam only while no transmission data is being superimposed on the visible light beam.

BRIEF SUMMARY OF THE INVENTION

An object of the invention is to accomplish reliable bidirectional visible-light beam communication by using a single light source.

An aspect of the present invention provides a system for visible light communication that utilizes both a retroflection function and a color-multiplex communications function, thereby accomplishing bidirectional visible-light beam communication that uses only one light source.

An apparatus for visible light communication, according to the aspect of the invention, comprises: a light reception unit configured to receive a visible light beam of a first color, which has been modulated with first transmission data, and a visible light beam of a second color different from the first color; a first optical filter configured to extract the visible light beam of the first color; a second optical filter configured to extract the visible light beam of the second color; a demodulation unit configured to demodulate the first transmission data from the visible light beam extracted by the first optical filter; and a transmission unit configured to modulate a reflected light beam obtained from the visible light beam extracted by the second optical filter, with second transmission data, and to transmit a visible light beam modulated with the second transmission data.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a flowchart explaining the operation of the visible-light communications system according to the embodiment.

DETAILED DESCRIPTION OF THE INVENTION

An embodiment of the present invention will be described with reference to the accompanying drawings.
(Configuration of the Visible-Light Communications System)

Figure 1:
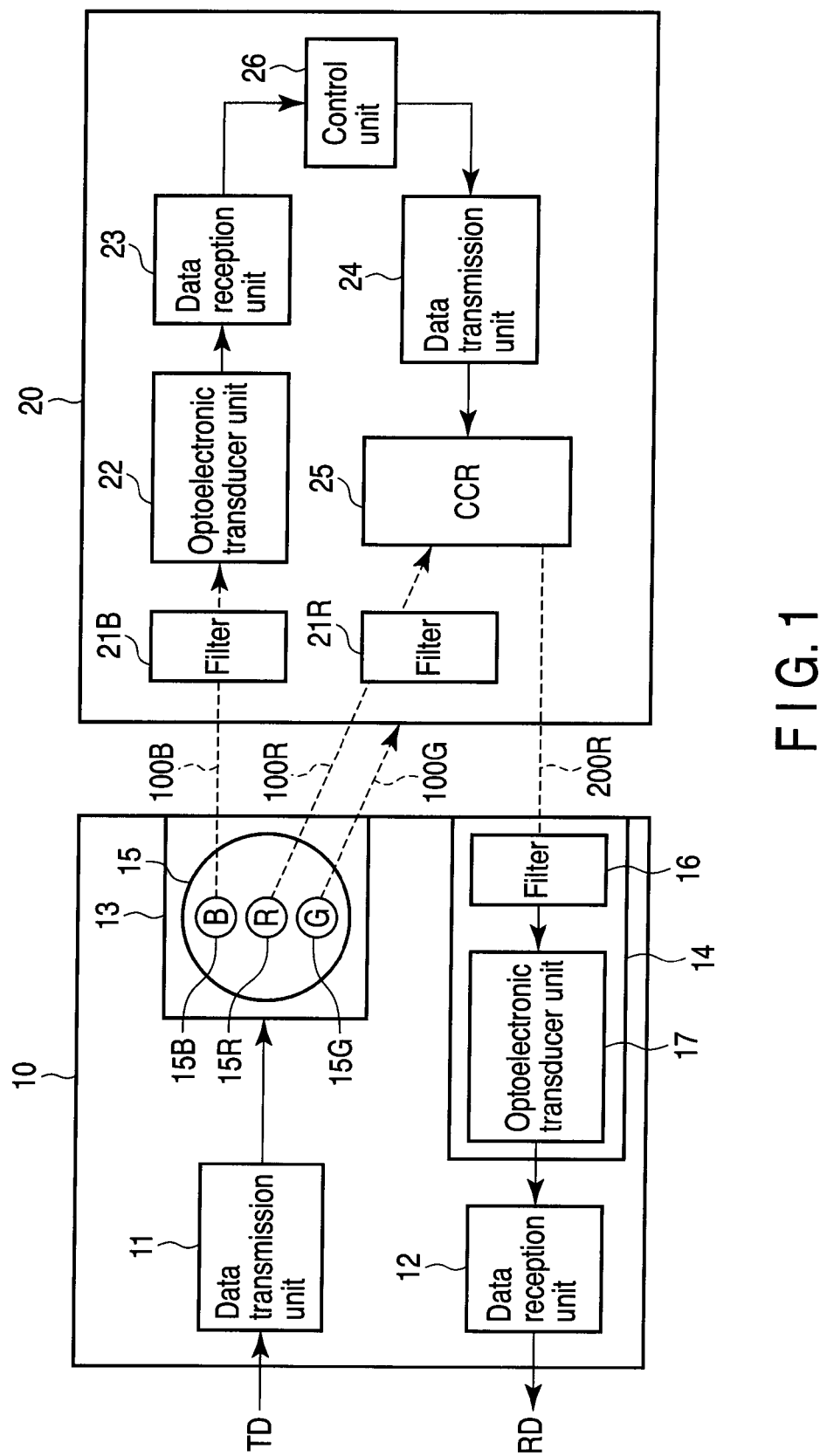
FIG. 1 is a block diagram showing the configuration of a visible-light communications system according to an embodiment of this invention.

FIG. 1 is a block diagram showing the configuration of a visible-light communications system according to this embodiment. As shown in FIG. 1, the visible-light communications system has two visible-light communications apparatuses; 10 and 20. In the system, bidirectional communication using visible light beams is performed between the visible-light communications apparatuses 10 and 20.

In the present embodiment, one visible-light communications apparatus 10 is a communications device incorporated in, for example, an illumination apparatus secured to the ceiling of a building. Hereinafter, the apparatus 10 will be referred to as "visible-light communications device 10" for convenience. The other visible-light communications apparatus 20 is a communications device incorporated in, for example, a cellular telephone. Hereinafter, the apparatus 20 will be referred to as "mobile terminal 20" for convenience.

Figure 3:
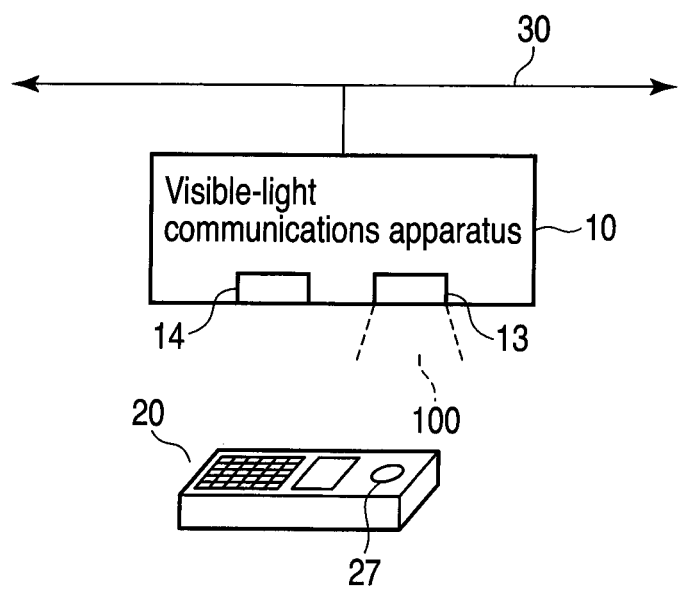
FIG. 3 is a diagram explaining an exemplary visible-light reception/transmission device for use in the embodiment.

The visible-light communications device 10 comprises a data transmission unit 11, a data reception unit 12, a light source 13, and a light reception unit 14. As FIG. 3 shows, the visible-light communications device 10 is connected to a network 30. Through the network 30, the device 10 receives transmission data TD from, for example, a server (not shown). The data transmission unit 11 modulates the transmission data TD, which is output to the light source 13.

As shown in FIG. 1, the light source 13 comprises an LED package (3-in-one package) 15 and an LED driver (not shown). The LED package 15 has a blue LED (B) 15B, a red LED (R) 15R and a green LED (G) 15G that are fabricated as one chip. The LED driver drives the LED package 15, causing the same to emit a visible light beam 100 as shown in FIG. 3.

In the LED package 15, the LED (B) 15B is driven in accordance with the modulated data supplied from the data transmission unit 11, emitting a blue visible light beam 100B. At the same time the LED (B) 15B is so driven, the red LED (R) 15R and green LED (G) 15G are driven by the LED driver but not with the modulated data, emitting a red visible light beam 100R and a green visible light beam 100G, respectively.

The light reception unit 14 includes an optical filter (R) 16, and an optoelectronic transducer unit 17. The optical filter (R) 16 extracts only a red visible light beam 200R from the visible light beam applied from the mobile terminal 20 as will be described later. The optoelectronic transducer unit 17 converts the red visible light beam 200R into an electric signal. The data reception unit 12 demodulates the data RD (response data) superimposed on the red visible light beam 200R with the electric signal supplied from the optoelectronic transducer unit 17. (The response data will be described later.)

As shown in FIG. 3, the mobile terminal 20 has an optical input/output unit 27. The optical input/output unit 27 includes a light reception unit and a light reflection unit. As FIG. 1 shows, the optical input/output unit 27 has an optical filter (B) 21B and an optical filter (R) 21R. The optical filter (B) 21B allows the passage of the blue light beam 100B only (or extracts the light beam 100B only). The optical filter (R) 21R allows the passage of the red light beam 100R only (or extracts the light beam 100R only). The optical input/output unit 27 further includes a retroflection unit 25 (hereinafter, referred to as "CCR" on some occasions).

Figure 2:
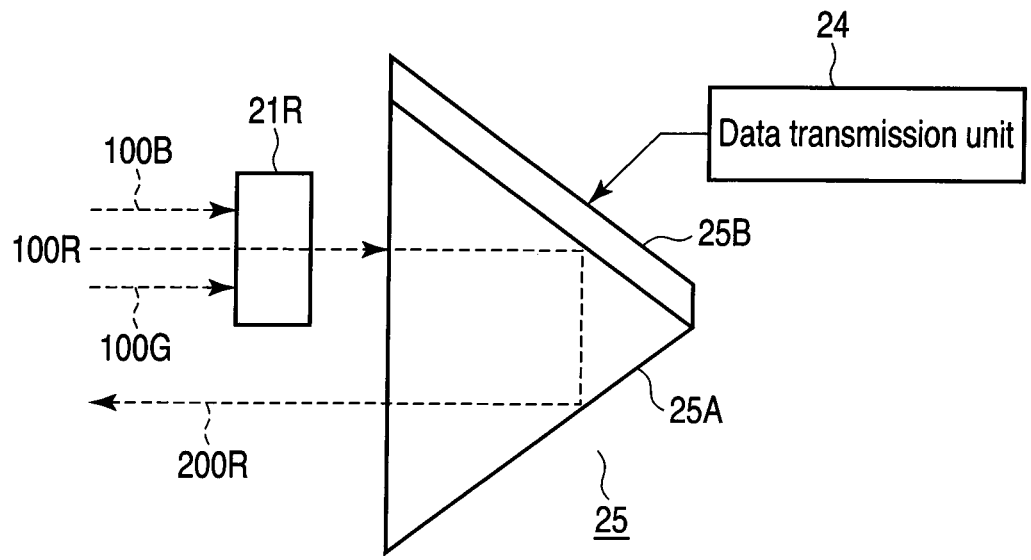
FIG. 2 is a diagram explaining an exemplary retroflection unit for use in the embodiment of the invention.

As shown in FIG. 2, the CCR 25 has a prism 25A and an optical shutter 25B. The prism 25a constitutes a corner-cube reflector. The optical shutter 25B is constituted by a liquid crystal shutter. The red light beam 100R passing through the optical filter (R) 21R is applied to the CCR 25. From the red light beam 100R, the CCR 25 generates a retroflection light beam in accordance with the reflectance of the optical shutter 25B, which changes.

The mobile terminal 20 further has an optoelectronic transducer unit 22, a data reception unit 23, a data transmission unit 24, and a control unit 26. The optoelectronic transducer unit 22 converts the blue visible light beam 100B extracted from the optical filter (B) 21B into an electric signal. The data reception unit 23 demodulates the transmission data TD superimposed on the blue visible light beam 100B from the electric signal supplied from the optoelectronic transducer unit 22.

The control unit 26 has the function of analyzing the transmission data TD demodulated by the data reception unit 23 and generating response data RD corresponding to the transmission data TD. The control unit 26 outputs the response data RD, as transmission data, to the data transmission unit 24.

The data transmission unit 24 outputs the demodulated signal generated by demodulating the response data RD. This demodulated signal controls the optical shutter 25B of the CCR 25. The CCR 25 outputs a retroflection light beam generated from the visible light beam 100R modulated with the response data RD, in accordance with the reflectance, which changes with the demodulated signal.

(Operation of the Visible-Light Communications System)

How the visible-light communications system according to this embodiment operates will be explained with reference to the flowchart of FIG. 4.

In this embodiment, the visible-light communications device 10 receives transmission data TD through the network 30 (Step S1). The transmission data TD has been generated as inquiry data that asks the user of the mobile terminal 20 for, for example, the ID data of the mobile terminal 20.

The data transmission unit 11 outputs the transmission data TD, which has been modulated, to the LED driver of the light source 13 (Step S2). In the light source 13, the LED driver drives the LED (B) 15B in accordance with the modulated data (Step S3). So driven, the LED (B) 15B emits a blue visible light beam 100B on which the transmission data TD is superimposed (Step S4).

In the light source 13, the LED driver drives the red LED (R) 15R and green LED (G) 15G with data that is not modulated, at the same it drives the LED (B) 15B (Step S5). So driven, the red LED (R) 15R emits a red visible light beam 100R (Step S6), and the green LED (G) 15G emits a green visible light beam 100G (Step S7). The visible light beams 100B, 100R and 100G are also used as illumination light.

In the mobile terminal 20, the optical input/output unit 27 receives the visible light beams 100B, 100R and 100G emitted from the light source 13 of the visible-light communications device 10. In the mobile terminal 20, the optical filter (B) 21B extracts the blue visible light beam 100B from the visible light received (Step S10). That is, the optical filter (B) 21B allows the passage of the blue visible light beam 100B only, not the passage of the other visible light beams 100R and 100G.

The optoelectronic transducer unit 22 receives the blue visible light beam 100B from the optical filter (B) 21B and converts the beam 100B into an electric signal. The electric signal is output to the data reception unit 23 (Step S11). The data reception unit 23 demodulates the electric signal, acquiring the transmission data TD (i.e., inquiry data) superimposed on the blue visible light beam 100B (Step S12). The transmission data TD is output to the control unit 26 (Step S13).

The control unit 26 analyzes the transmission data TD (i.e., inquiry data) demodulated by the data reception unit 23 and recognizes the data TD as inquiry data requesting for, for example, the ID data of the user. In response to the inquiry data, the control unit 26 generates response data (i.e., ID data in this case) (Step S14). The response data is output in response to the inquiry data (Step S15). The data transmission unit 24 modulates the response data (ID data) and outputs the same to the CCR 25 (Step S16).

In the mobile terminal 20, the optical filter (R) 21R extracts the red visible light beam 100R from the visible light the optical input/output unit 27 (FIG. 3) has received (Step S17). That is, the optical filter (R) 21R allows the passage of the red visible light beam 100R only, not the passage of the other visible light beams 100B and 100G. The CCR 25 receives only the visible light beam 100R that has passed through the optical filter (R) 21R. In the CCR 25, the reflectance of the optical shutter 25B changes in accordance with the modulated response data (ID data) from the data transmission unit 24. The CCR 25 therefore emits a red retroflection light beam 200R generated by modulating the visible light beam 100R with this reflectance (Step S18).

In the visible-light communications device 10, the light reception unit 14 receives the red retroflection light beam 200R applied from the mobile terminal 20. In the light reception unit 14, the optical filter (R) 16 extracts the red visible light beam 200R from the visible light received (Step S20). That is, only the visible light beam 200R modulated with the response data (ID data) passes through the optical filter (R) 16 and reaches the optoelectronic transducer unit 17. The optoelectronic transducer unit 17 converts the red visible light beam 200R into an electric signal. This electric signal is output to the data reception unit 12 (Step S21).

The data reception unit 12 demodulates the electric signal output from the optoelectronic transducer unit 17, acquiring the response data (ID data) superimposed on the red visible light beam 200R (Step S22). The response data is output, as reception data, to the network 30 (Step S23).

In the visible-light communications system so configured as described above, a visible light emitted from the single light source 13 of the visible-light communications device 10 incorporated in, for example, a fixed illumination apparatus can be utilized to achieve bidirectional visible-light communication between the visible-light communications device 10 and the mobile terminal 20. That is, using solely one light source, bidirectional visible-light communication can be accomplished owing to the retroflection unit (CCR) 15, optical filters and multiplex communication using light beams of various colors.

In the system according to this embodiment, the mobile terminal 20 with limited power consumption can be one communications apparatus communicating with another communication apparatus 10 that has one light source 13. The mobile terminal 20 can perform visible light communication with another communication apparatus, without having a light source that consumes power. If multiplex communication using a CCR and optical filters that pass visible light beams of various colors are used, bidirectional visible-light communication can be reliably accomplished, without causing interference between the visible light beams of different colors. Moreover, the use of a CCR can perform retroflection, i.e., accurate reflection of the light beam emitted from the light source. No positioning of components or the optical-axis alignment thereof is required to accomplish such visible light communication.

In the present embodiment, the CCR 25 has a prism 25A. The CCR 25 is not limited to this configuration, nevertheless. The prism 25A may be replaced by a reflector or spherical transparent bead that performs retroflection on the input light beam. Alternatively, the prism 25A may be replaced by a plurality of retroflection plates arranged in a specific manner.

In the present embodiment, the single light source is an LED package (3-in-one package) 15, which has three LED chips; a blue LED (B) 15B, a red LED (R) 15R and a green LED (G) 15G, respectively. Nevertheless, the light source is not limited to such a package. The light source may be one that emits at least two visible light beams of different colors. It may have, for example, a blue LED and a red LED that are independently driven, or a blue LED and a red LED. In either case, two optical filters are used for passing the two visible light beams of different colors.

In the embodiment described above, one communications apparatus is a visible-light communications device 10 incorporated in a fixed illumination apparatus, and the other communications apparatus is and a mobile terminal 20 such as a cellular telephone. This invention is not limited to this, nevertheless. One communications apparatus could be a communication-dedicated device provided in an outdoor unit arranged on a road or a building. The other communications apparatus may be any other communication-dedicated device that is portable and limited in power consumption.

To summarize the foregoing, the embodiment described above can reliably achieve bidirectional visible-light communication using a single light source. Particularly, it can provide a bidirectional visible-light communications system in which one communication partner is, for example, a mobile terminal that has no light sources.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for visible light communication, comprising:
   a light transmitting unit configured to transmit a visible light beam of a first color, which has been modulated with first transmission data, and a visible light beam of a second color different from the first color and not modulated with data, wherein the light transmitting unit includes a first light emitting diode emitting the first color and a second light emitting diode emitting the second color;
   a light reception unit configured to receive the visible light beam of the first color, which has been modulated with the first transmission data, and the visible light beam of the second color different from the first color and not modulated with data;
   wherein the light reception unit includes:
      a first optical filter configured to extract the visible light beam of the first color;
      a second optical filter configured to extract the visible light beam of the second color;
      a demodulation unit configured to demodulate the first transmission data from the visible light beam of the first color extracted by the first optical filter;
      a retroflection unit configured to generate a reflected light beam from the visible light beam of the second color extracted by the second optical filter, wherein the retroreflection unit is a corner cube reflector in the from of a prism, the reflected light beam is reflected on first and second internal surfaces of the prism, one of the first and second internal surfaces of the prism is a shutter that changes the reflectivity of the one surface, and the shutter is a liquid crystal shutter; and
   a transmission unit configured to modulate the reflected light beam with second transmission data, and to transmit the modulated reflected light beam to another apparatus, wherein the transmission unit includes a modulation unit configured to change retroreflection reflectance of the retroreflection unit in accordance with the second transmission data by controlling the shutter, and the modulation unit modulates the reflected light with the second transmission data.

2. A system for visible light communication, comprising:
   a visible-light data transmission apparatus having a light source for emitting a visible light beam of a first color and a visible light beam of a second color different from the first color, and configured to apply, at the same time, the visible light beam of the first color, modulated with first transmission data, and the visible light beam of the second color, not modulated with data, wherein the visible-light data transmission apparatus includes a first light emitting diode emitting the first color and a second light emitting diode emitting the second color; and a visible-light communications apparatus configured to receive the visible light beams emitted from the light source, and to demodulate the first transmission data, wherein the visible-light communications apparatus comprises:

a first optical filter configured to extract the visible light beam of the first color;

a second optical filter configured to extract the visible light beam of the second color;

a demodulation unit configured to demodulate the first transmission data from the visible light beam of the first color extracted by the first optical filter;

a retroflection unit configured to generate a reflected light beam from the visible light beam of the second color extracted by the second optical filter, wherein the retroreflection unit is a corner cube reflector in the form of a prism, the reflected light beam is reflected on first and second internal surfaces of the prism, one of the first and second internal surface, and the shutter is a liquid crystal that the reflectivity of the one surface, and the shutter is a liquid crystal shutter; and a transmission unit configured to modulate the reflected light beam with second transmission data, and to transmit the modulated reflected light beam to another apparatus, wherein the transmission unit includes a modulation unit configured to change retroflection reflectance of the retroreflection unit in accordance with the second transmission data by controlling the shutter, and the modulation unit modulates the reflected light beam with the second transmission data.

3. The system according to claim 2, further comprising a visible-light data reception apparatus configured to receive the modulated reflected light beam transmitted from the transmission unit and demodulate the second transmission data from the modulated reflected light beam.

4. The system according to claim 3, wherein the visible-light data reception apparatus comprises:

a light reception unit configured to receive the reflected light beam from the transmission unit;

an optical filter configured to extract the visible light beam of the second color, from the reflected light beam received by the light reception unit; and a demodulation unit configured to demodulate the second transmission data from the visible light beam extracted by the optical filter.

5. The system according to claim 2, wherein the transmission unit comprises:

a unit configured to generate the second transmission data corresponding to the first transmission data demodulated by the demodulation unit.

6. The system according to claim 2, wherein the first light emitting diode and the second light emitting diode can be driven independently.

7. The apparatus according to claim 1, being a mobile device and further comprising:

a memory configured to store the first transmission data demodulated by the demodulation unit; and a data processing unit configured to generate the second transmission data.

8. The system according to claim 5, wherein the visible-light communications apparatus is a mobile device having:

a memory configured to store the first transmission data demodulated by the demodulation unit; and a data processing unit configured to generate the second transmission data.

9. A method of visible light communication, comprising:

transmitting, at a first apparatus, a visible light beam of a first color, which has been modulated with first transmission data, and a visible light beam of a second color different from the first color which has not been modulated with data, wherein the first apparatus includes a first light emitting diode emitting the first color and a second light emitting diode emitting the second color;

receiving, at a second apparatus, the visible light beam of the first color, which has been modulated with the first transmission data, and the visible light beam of the second color different from the first color which has not been modulated with data;

demodulating the first transmission data from the visible light beam of the first color;

generating a reflected light beam from the visible light beam of the second color with a corner cube reflector in the form of a prism, wherein the reflected light beam is reflected on first and second internal surfaces of the prism one, of the first and second internal surfaces of the prism is a shutter that changes the reflectivity of the one surface, and the shutter a liquid crystal shutter; and modulating the reflected light beam with second transmission data by changing the reflectance of the corner cube reflector in accordance with the second transmission data by controlling the shutter, and transmitting the modulated reflected light beam to a third apparatus.

10. The method of claim 9 wherein the first and third apparatus are the same apparatus.

* * * * *

UNITED STATES PATENT AND TRADEMARK OFFICE
CERTIFICATE OF CORRECTION

PATENT NO. : 8,805,202 B2  
APPLICATION NO. : 12/491318  
DATED : August 12, 2014  
INVENTOR(S) : Suzuki et al.

Page 1 of 1

It is certified that error appears in the above-identified patent and that said Letters Patent is hereby corrected as shown below:

In the Claims

Claim 2, col. 7, lines 19-20, delete "one of the first and second internal surface, and the shutter is a liquid crystal that" and insert --one of the first and second internal surfaces of the prism is a shutter that changes the reflectivity of the one surface, and the shutter is a liquid crystal shutter; and--.

Claim 8, col. 8, line 14, delete "according to claim 5" and insert --according to claim 2--.

Claim 9, col. 8, line 38, delete "prism one, of the first" and insert --prism, one of the first--.

Signed and Sealed this  
Twenty-fifth Day of November, 2014

Michelle K. Lee  
*Deputy Director of the United States Patent and Trademark Office*